(12) United States Patent
Chopra et al.

(10) Patent No.: US 11,102,208 B2
(45) Date of Patent: Aug. 24, 2021

(54) AUTOMATIC WHITELISTING USING WILDCARDING

(71) Applicant: Nicira, Inc., Palo Alto, CA (US)

(72) Inventors: Amit Chopra, Sunnyvale, CA (US); Daniel G. Wing, Los Altos, CA (US); Vijay Ganti, Cupertino, CA (US); Christopher Corde, Burlingame, CA (US); Amit Patil, Pune (IN); Peixiao Lin, Santa Clara, CA (US); Sanjay Sanghavi, Pune (IN)

(73) Assignee: Nicira, Inc., Palo Alto, CA (US)

( * ) Notice: Subject to any disclaimer, the term of this patent is extended or adjusted under 35 U.S.C. 154(b) by 359 days.

(21) Appl. No.: 16/286,784

(22) Filed: Feb. 27, 2019

(65) Prior Publication Data

US 2019/0190919 A1 Jun. 20, 2019

Related U.S. Application Data

(63) Continuation-in-part of application No. 16/112,648, filed on Aug. 25, 2018.

(60) Provisional application No. 62/550,580, filed on Aug. 26, 2017.

(51) Int. Cl.
*G06F 21/55* (2013.01)
*H04L 29/06* (2006.01)

(52) U.S. Cl.
CPC .......... *H04L 63/101* (2013.01); *G06F 21/552* (2013.01); *H04L 63/108* (2013.01); *H04L 63/1408* (2013.01); *H04L 63/1441* (2013.01)

(58) Field of Classification Search
CPC . H04L 63/101; H04L 63/108; H04L 63/1408; H04L 63/1441; G06F 21/53; G06F 21/552
See application file for complete search history.

(56) References Cited

U.S. PATENT DOCUMENTS

| | | | |
|---|---|---|---|
| 10,291,654 B2* | 5/2019 | Banerjee | H04L 63/101 |
| 2015/0146716 A1* | 5/2015 | Olivier | H04L 65/1006 370/352 |
| 2017/0235595 A1* | 8/2017 | Vankadaru | G06F 16/951 718/1 |
| 2019/0286833 A1* | 9/2019 | Takumi | G06F 21/51 |

* cited by examiner

*Primary Examiner* — Olugbenga O Idowu (57) ABSTRACT

A computer security system provides for auto-populating process-connection whitelists using process wildcarding and connection wildcarding. Process wildcarding involves grouping process-connection requests together in a process* group without regard to the presence of distinct process arguments; in contrast, some process-connection requests may be separated both by process and by argument into process●argument groups. The process-connection requests may then be analyzed on a group-by-group basis to determine which processes can be mapped to wildcarded connection in a respective process-connection whitelist.

13 Claims, 10 Drawing Sheets

OUTBOUND CONNECTION GROUPING ALGORITHM 500

SELECT TCP OR UDP OUTGOING CONNECTION GROUP/SUBGROUP 501

↓

IS THERE ANY CONNECTION WITH REMOTE ADDRESS, REMOTE PORT, & LOCAL PORT WILDCARDED?
( * , * , * )
502

N ↓      Y ↓

GROUP ALL CONNECTIONS INTO ONE GROUP WITH
PORT CATEGORY = ALL
PORTGROUPTYPE = ALLOWALL
IPCATEGORY = ALL
IPGROUPTYPE = ALLOWALL
503

↓

IS THERE AT LEAST ONE REMAINING CONNECTION WITH REMOTE ADDRESS & REMOTE PORT WILDCARDED & LOCAL PORT WITH VALID NUMBER?
( * , * , VALID# )
504

N ↓      Y ↓

FOR EACH SUCH VALID# LOCAL PORT GROUP ALL CONNECTIONS WITH THAT LOCAL PORT INTO ONE GROUP WITH
PORT CATEGORY = ALL
PORTGROUPTYPE = ALLOWALL
IPCATEGORY = ALL
IPGROUPTYPE = ALLOWALL
multicastPort = local port valid#
505

AUTOMATIC WHITELISTING USING WILDCARDING

BACKGROUND

The intended functioning of an application may be subverted by maliciously or unintentionally introduced malware. Anti-malware programs often contain blacklists of problematic executable files, allowing listed executables to be detected, quarantined and removed. However, there can be a lag between the time malware is created and when it is represented on a blacklist, leaving windows of vulnerability for malicious attacks.

Whitelists represent an alternative and complementary approach to securing an application. For example, a whitelist can list all the executables and/or processes allowed on a (virtual or physical) application host. Unlisted processes can be blocked and unlisted executables can be quarantined and removed.

One challenge for whitelists is that they must vary depending on the installed software. This challenge is compounded for complex applications with components distributed among respective hosts as different whitelists may be required for each host. For example, an online retail site may have hosts with web servers, transaction handling, and databases for product catalogs and customer profiles. Populating whitelists manually can thus be quite burdensome. For this reason, automated approaches to populating whitelists can be desirable.

DETAILED DESCRIPTION

The present invention provides for auto-populating process-connection whitelists using wildcarding to include process-connection combinations beyond those observed, e.g., during a learning mode. Process-connection wildcarding can include: 1) process-argument wildcarding; and 2) connection wildcarding. Process argument wildcarding can lead to allowing all instances of a process uniformly despite different command-language interpreter (CLI) arguments (even arguments that have not been observed). Connection abstraction can lead to mapping processes to all ports of a given type and/or all Internet Protocol (IP) addresses of a given subnet so as to include connections not previously observed. Applying process-connection wildcarding selectively can greatly reduce the incidence of false-negative alerts without unduly increasing the incidence of false-positive allowances of problematic connections.

Figure 1:
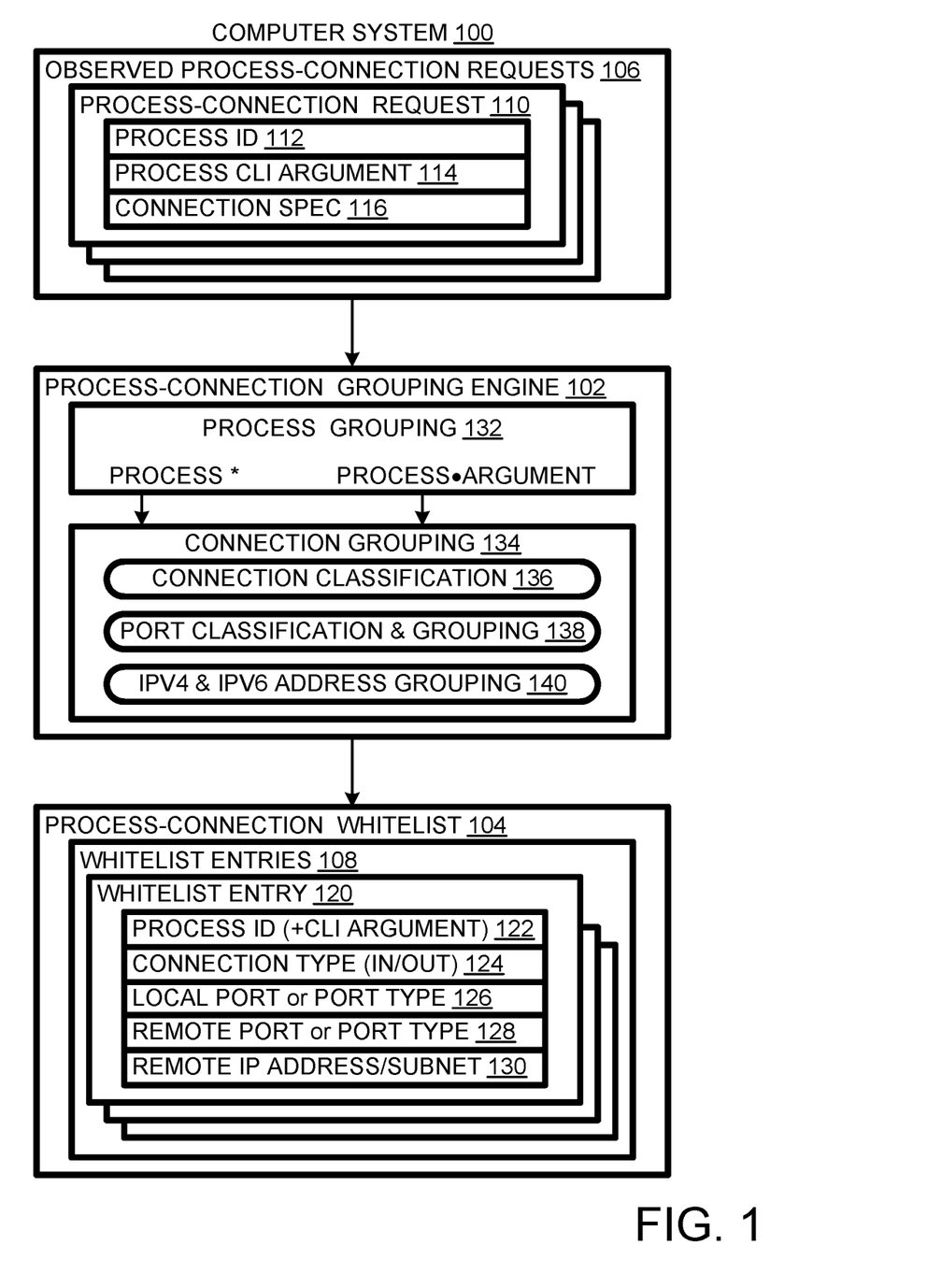
FIG. 1 is a schematic diagram of a computer system with a process-connection grouping engine used in auto-populating a process-connection whitelist.

As shown in FIG. 1, a computer system 100 includes a process-connection grouping engine 102 and a process-connection whitelist 104. Engine 102 accepts observed process connection requests 106 as inputs, and outputs whitelist entries 108 to process-connection whitelist 104. A connection request 110 of requests 106 includes a process identifier 112, a process CLI argument 114, and a connection specification 116. In general, each of requests 110 includes a process ID and a connection specification, but may or may not include a process CLI argument.

A whitelist entry 120 of whitelist entries 108 specifies a process identity 122, a connection type 124 (in this case with a CLI argument), a local port or port type 126, a remote port or port type 128, and a remote IP address or subnet 130. In general, whitelist entries 108 can include the following types, TCP outgoing, TCP incoming, UDP outgoing, and UDP incoming. In what follows, TCP outgoing and UDG outgoing are treated similarly; and TCP incoming and UDP incoming are treated similarly. Entries of entries 108 of the TCP or UDP type do not specify a remote port or port type and do not specify a remote IP address or subnet. Also, not all process IDs are associated with a CLI argument, e.g., because the argument is wildcarded.

Process-connection grouping engine 102 includes a process grouping function 132. The purpose of process-grouping function 132 is to determine, for each observed process, whether instances of that process with different CLI arguments should be treated collectively or separately. For example, a Python process can accept a script as a CLI argument. A Python script can affect which connections are specified in a process-connection request. Therefore, Python processes with respectively distinct CLI arguments should be treated as different processes for purposes of auto-populating a process-connection whitelist.

On the other hand, a windows "change directory" or "cd" process can accept CLI arguments, but these arguments do not affect what connections requested by the cd process should or should not be allowed. Therefore, all instances of the cd process should be treated collectively even if different arguments are specified. In effect, the arguments for the cd process are "wildcarded" to include arguments that have not been previously observed. For processes that cannot be classified in advance, decisions can be based on the number of distinct arguments observed per process, e.g., during learning mode.

In some embodiments, there are exceptions to the general rule that connection-behavior variant process should be grouped by argument rather than wildcarded. For example, a "tanium" process can have CLI arguments which explicitly specify connection destinations; such processes may be treated as if the argument is wildcarded rather than as a process for which the allowed connections vary according to the CLI argument. In such a case, a separate check can be made whether the requested connection matches the destination specified in the argument, the connection being allowed only if there is a match.

The results of process-argument grouping function 132 are input to a connection-grouping function 134 of engine 102. Thus, connection-abstraction function 134 may receive as an input: 1) a process for which CLI arguments do not affect which connections should and should not be allowed; and 2) a combination of a process and a CLI argument, where the CLI argument may affect whether or not a requested connection should be allowed. In either case, the connection grouping function 134 determines whether the requested connections may be generalized through wildcarding or whether the allowed connections should be restricted to those observed. However, before detailing the operation of engine 102, some context for its operation is provided.

Figure 2:
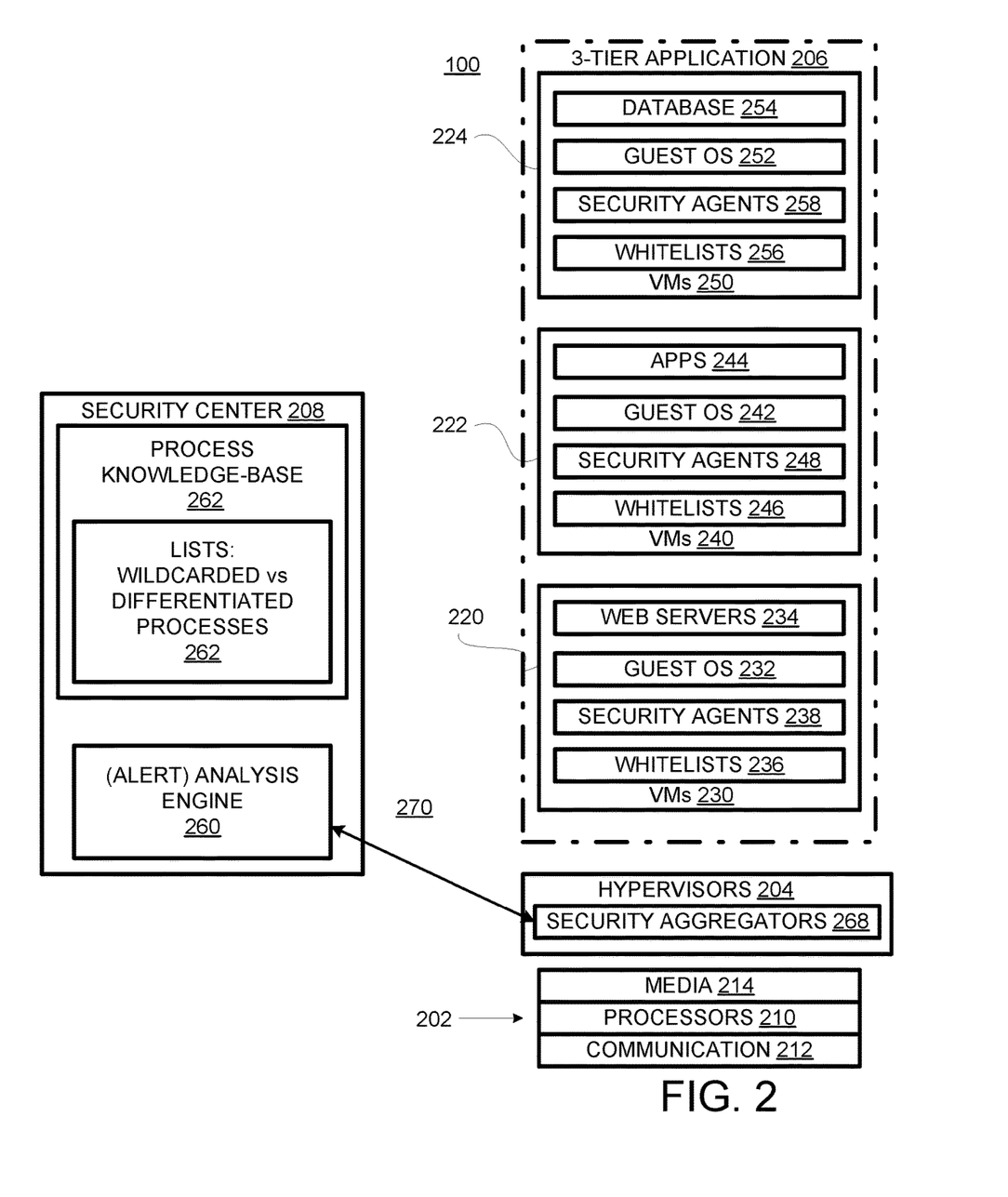
FIG. 2 is a schematic diagram of the computer system of FIG. 1 including security agents incorporating connection-grouping engines such as the one shown in FIG. 1.

As shown in FIG. 2, computer system 100 includes hardware 202, virtualizing software, e.g., hypervisors 204, a three-tier application 206, and a security center 208. Hardware 202 includes processors 210, communications devices 212, and non-transitory media 214. Media 214 is encoded with code defining the functionality of hypervisors 204, three-tier app 206, and security center 208. Hypervisors 204 run on hardware 202, while three-tier application 206 and security center 208 run on hypervisors 204.

Three-tier application 206 is typical of many enterprise applications, such as on-line retail sites, social-media sites, and news sites, in having a web-server tier 220, an app tier 222, and a database tier 224. Web-server tier includes virtual machines 230, which host respective guest operating systems (OSs) 232, which in turn host respective instances of web-server programs 234. App tier 222 includes virtual machines 240 which host respective guest OSs 242, which in turn host apps 142, which vary across embodiments depending on the overall mission of the three-tier application. Database tier 224 includes virtual-machines 250, which host respective OSs 252, which, in turn, host respective database instances 254.

Security center 208 includes an analysis engine 260 and a process knowledgebase 262. Analysis engine 260 is used for analyzing process information in general and alerts issued in response to disallowed connection requests by processes of three-tier application 206. Knowledge-base 262 includes information regarding processes, especially those running on three-tier application 206. Knowledgebase 262 includes various lists, including a list of processes for which instances with different arguments should be treated separately for process-connection whitelisting purposes, a list of processes instances of which should be treated collectively despite having different arguments, and lists of directories including only processes instances of which should be treated collectively despite having different arguments. Other embodiments can include only some or all of these lists and may include additional lists relevant to auto-populating whitelists.

The whitelists of interest reside in respective virtual machines of three-tier application 206. Each virtual machine 230 of web-server tier 220 includes a respective whitelist 236, managed and used by a respective security agent 238. Each virtual machine 240 of app tier 222 includes a respective whitelist 246 managed and used by a respective security agent 248. Each virtual machine 250 of database tier 244 includes a respective whitelist 256 managed and used by a respective security agent 258.

During normal (protect-mode) operation, each security agent of application 206 monitors processes executing in the respective virtual machine, allowing process-connection requests that are matched in the respective whitelist. If no match is found, the security agent may issue an alert to security center 208. Typically, the alert is first sent to a security aggregator 268 of a respective hypervisor. Each security aggregator 268 aggregates alerts received from security agents of virtual machines hosted by the respective hypervisor. The aggregation reduces network traffic, which can be important in some cases such as denial-of-service attacks. During a learning mode, security agents of application 206 auto-populate their respective whitelists. Each security agent includes a process-connection abstraction engine 102. Each security agent uses process-connection grouping as in the following whitelist process.

Figure 3:
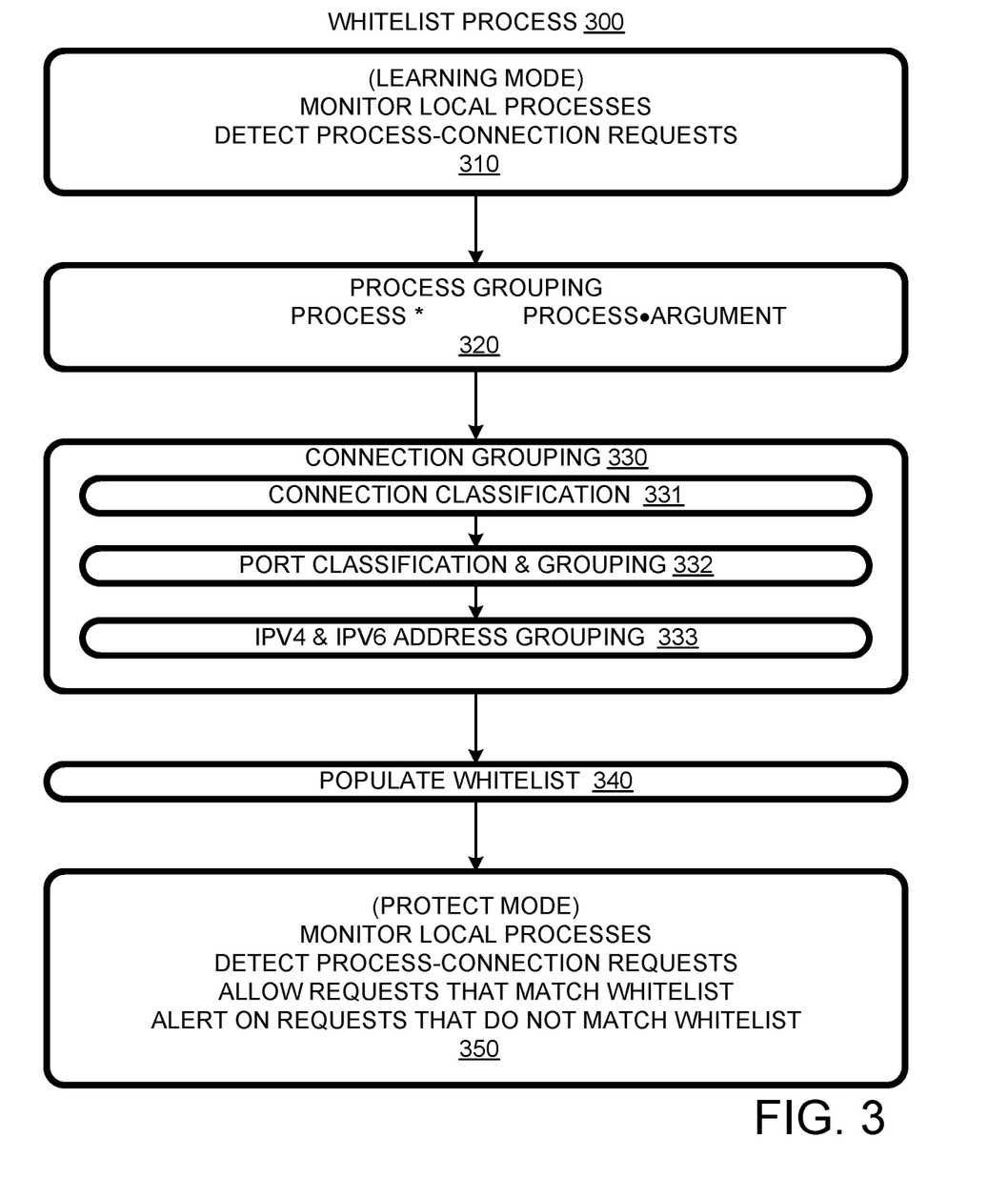
FIG. 3 is flow chart of a procedure for auto-populating and using a process-connection whitelist.

A whitelist process 300, flow-charted in FIG. 3, provides for auto-populating and using a whitelist. At 310, which can occur during a learning mode, a security agent monitors respective (local) processes to detect process connection requests. Processes may request incoming and outgoing UDP and TCP protocol requests. Outgoing UDP and TCP connection requests can specify a process ID (e.g., process name, process path, and process hash), a local port, a local IP address, a remote port, and a remote IP address). The local port, the remote port, and the remote IP address may be wildcarded in an outgoing TCP or UDP connection request. An incoming (listening) connection request specifies a local port, which may be wildcarded. A wildcarded parameter can assume any value, at least within a specific range.

Process grouping is performed at 320. The purpose of process grouping 302 is to partition process-connection requests into two classes: "Class 1" and "Class 2". Class 1 includes all process-connection requests by processes that are to be treated as a single "process*" group for whitelist auto-population without regard to any arguments specified in the request. Class 2 includes process requests by processes that are to be treated separately according to arguments specified in the request; in other words, Class 2 includes "process●argument" groups of combinations of processes and their respective arguments. Typically, Class 1 includes connection-behavior-invariant (CBI) processes, that is, processes the connection behaviors of which are not affected by arguments, while Class 2 typically includes connection-behavior-variant (CBV) processes the connection behavior of which can vary according to arguments present in the process-connection requests. However, there can be exceptions to what is typical.

For example, a user can execute a software-upgrade process with different schedules as CLI arguments, but to check if the update is available or not involves the same outgoing connection. Accordingly, a software-upgrade process would be considered CBI and would likely be put in Class 1. On the other hand, Python processes accept scripts as arguments and these scripts can affect which connections are requested. For another example, Java processes accept .jar files as arguments, and these can affect which connections are requested. Thus, Python and Java processes are considered CBV processes and are likely to be in Class 2.

Figure 4:
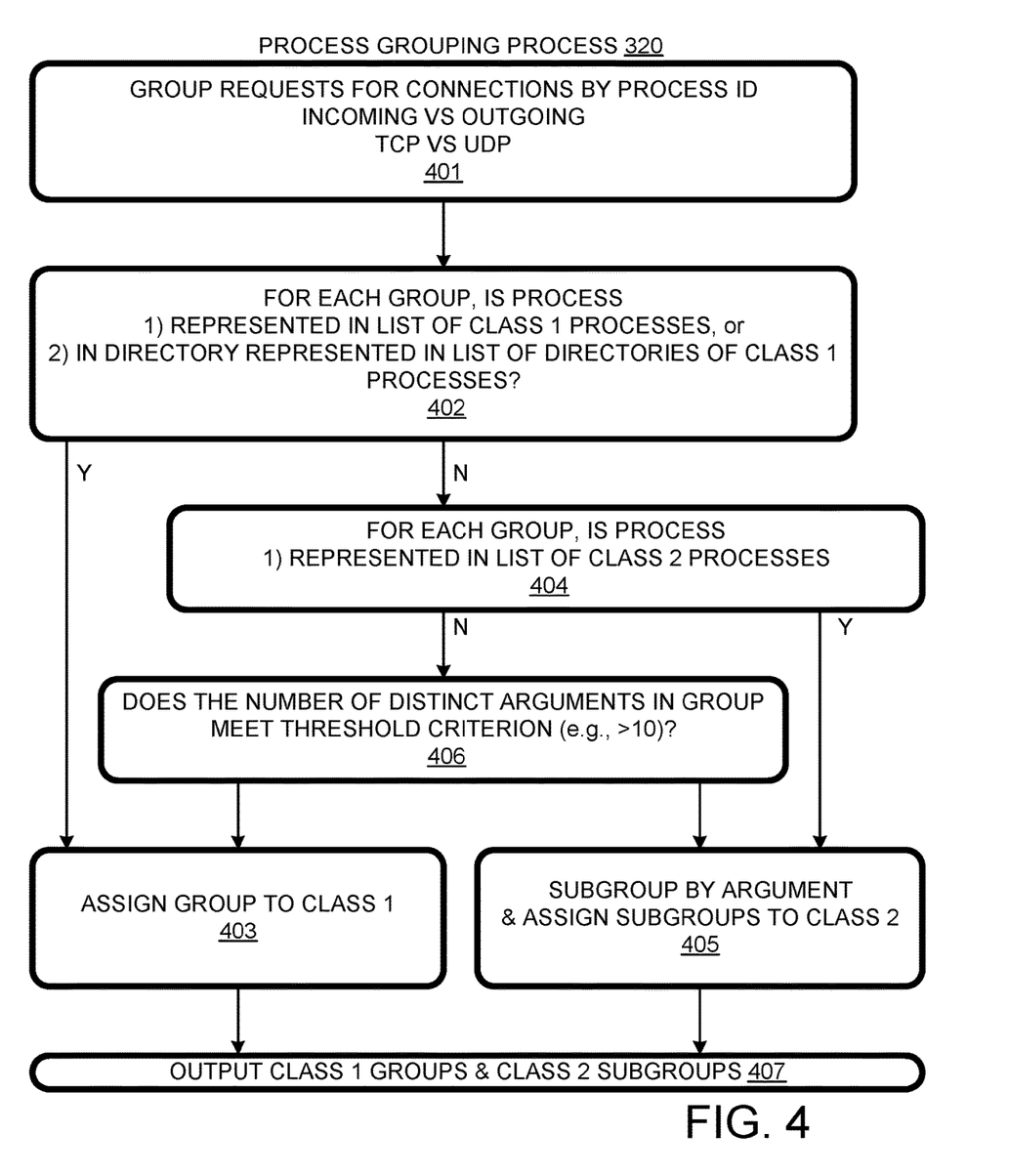
FIG. 4 is a detailed flow chart of a process-argument grouping procedure of FIG. 3.

Process grouping 320 is flow-charted in greater detail in FIG. 4. At 401, incoming and outgoing process-connection requests are treated separately. Both outgoing-connection requests are grouped by process ID (regardless of argument); likewise, incoming-connection requests are grouped by process ID. At 402, for each group, determine whether the process is either: 1) represented in a list of Class 1 processes; or 2) included in a directory (folder) represented in a list of directories that contain exclusively Class 1 processes (to the exclusion of Class 2 processes and unclassified processes). If yes, assign the process to Class 1 at 403. If no, proceed to 404.

At 404, for each group not already assigned to Class 1, determine whether or not the respective process is represented in a list of Class 2 processes. (In some embodiments, a Class 2 process may be in a directory represented in a list of directories exclusively containing Class 2 processes). If yes, assign the process to Class 2 at 405. If no, proceed to 406.

Note that, in process-grouping 320, processes are classified based on the contents of lists, e.g., lists that are local to the respective security agent. These may be populated by default based on information obtained from lists 262, which classify CBI processes as Class 1 and CBV processes as claim 2. However, an administrator may manually revise lists 262 and/or the local lists. Nothing precludes an administrator from entering a CBI process in Class 2 or a CBV process in Class 1.

At 406, the remaining process-connection requests correspond to processes that were not previously identified as belonging either to Class 1 or Class 2. In other words, their classifications are "to-be-determined" or "tbd". To each of these groups of process-connection requests, a criterion is applied to distinguish Class 1 processes from Class 2 processes. The criterion can involve a threshold number of arguments represented by the grouped requests. For example, if a group of requests includes more than 10 distinct arguments, then the process is assigned to Class 1 at 403. A group of request including 10 or fewer distinct arguments is assigned to Class 2 at 405. Finally, output the Class 1 groups and the Class 2 subgroups for connection grouping at 303, FIG. 3.

Figure 5A:
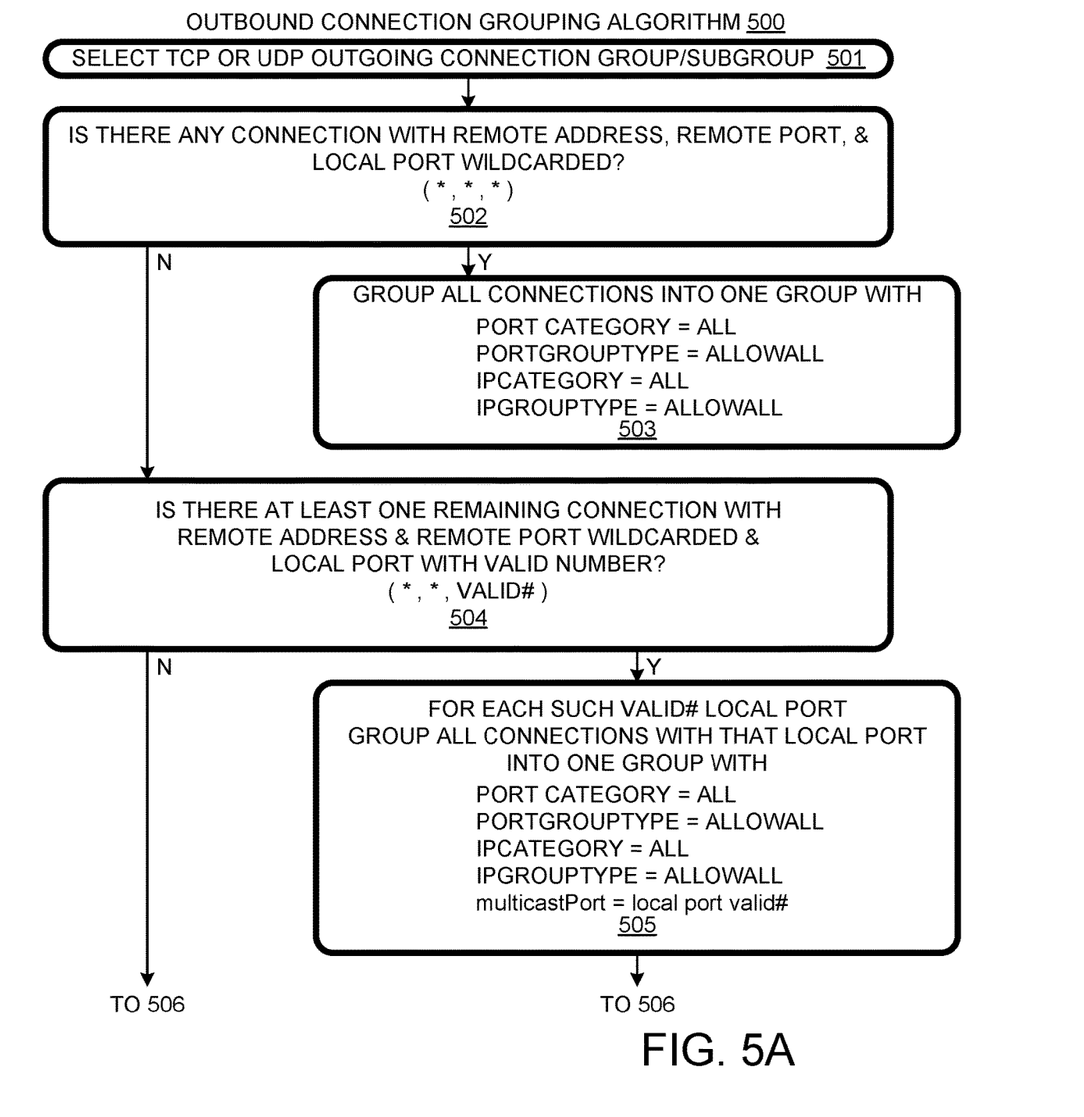
FIGS. 5A, 5B and 5C constitute a flow chart of an output connection grouping process of a connection grouping action of FIG. 3.
Figure 5B:
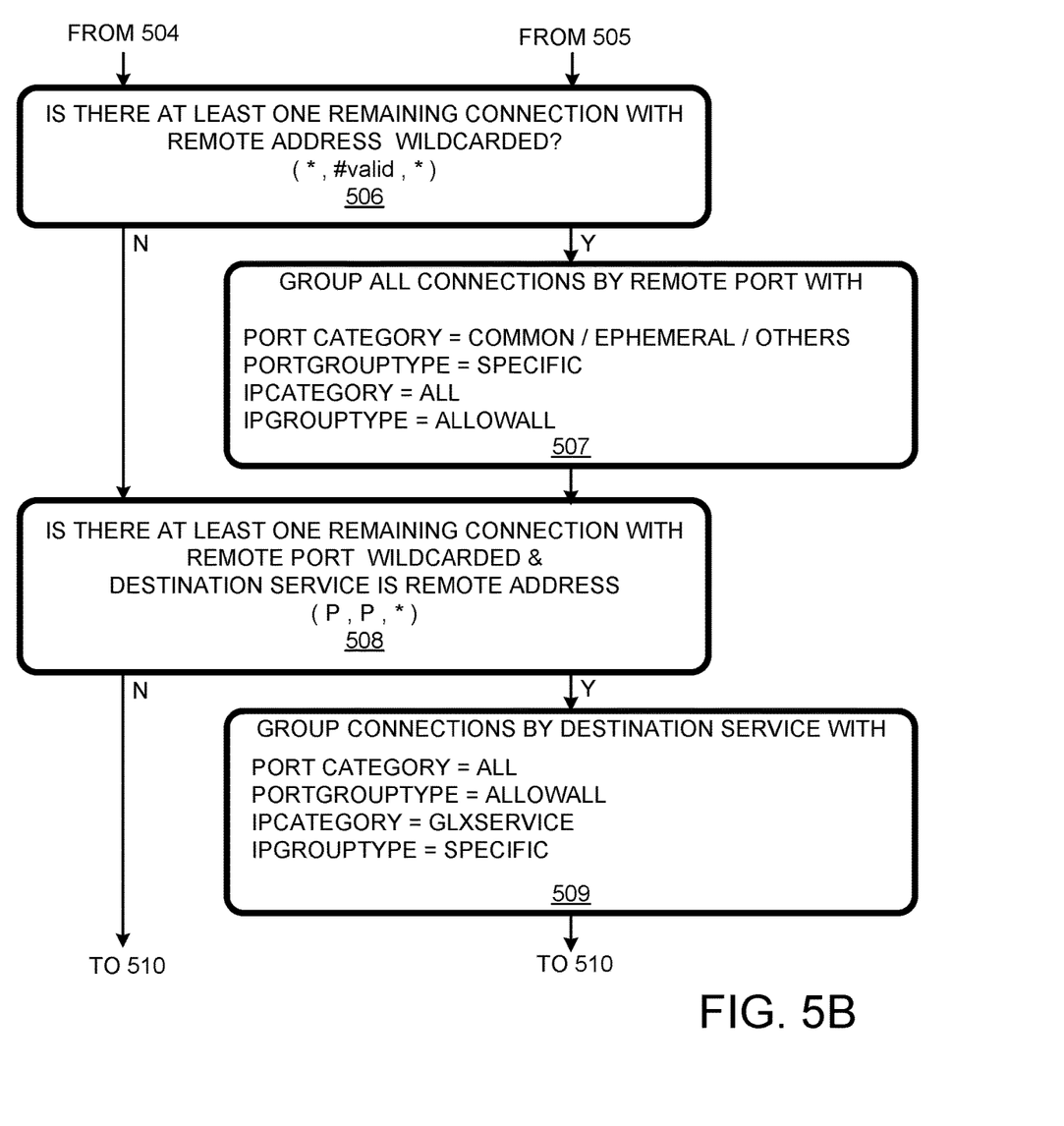
Figure 5C:
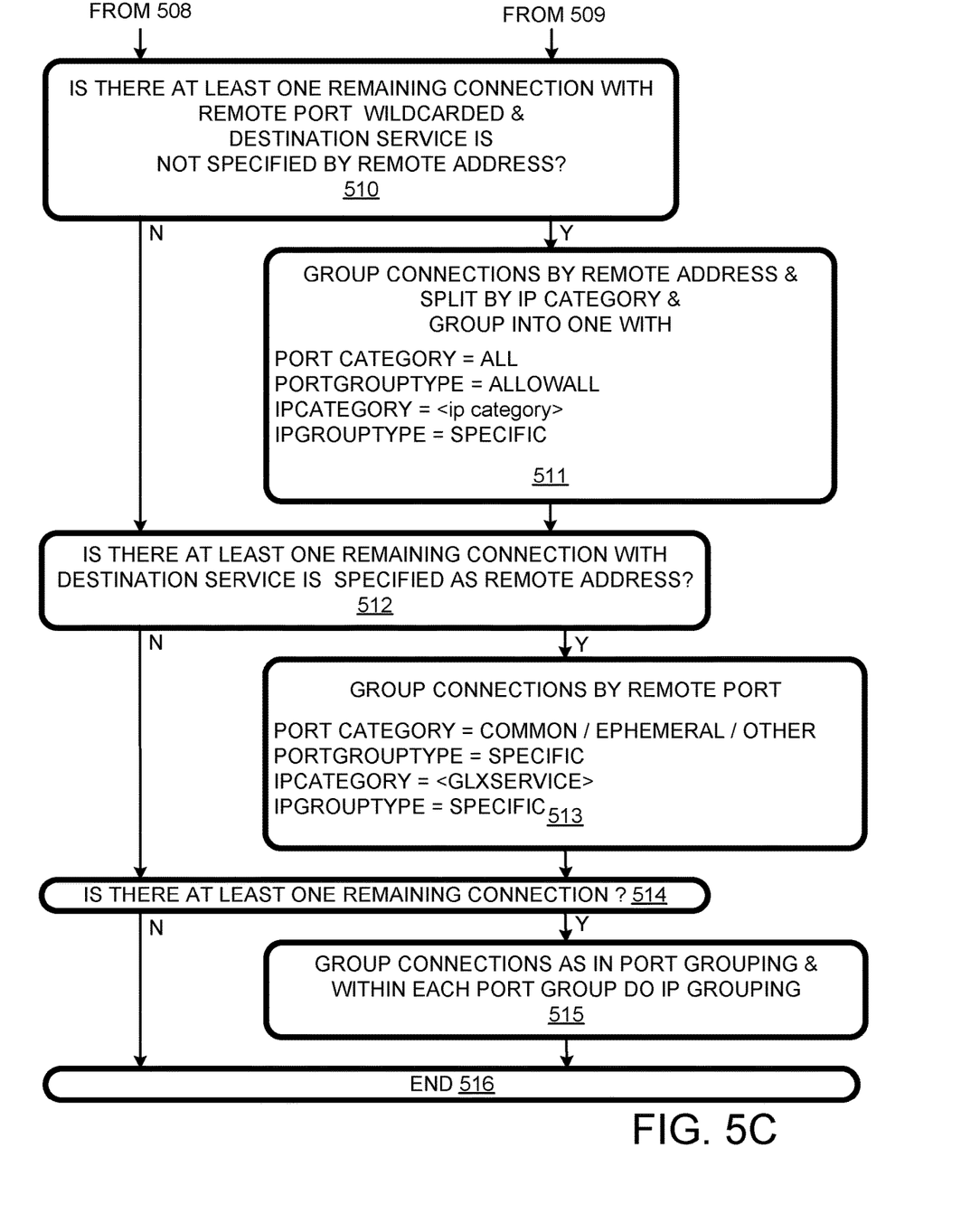

Connection grouping 330 is flow charted in greater detail in FIGS. 5A-5C, which detail an allowed connection grouping procedure 500. This procedure accepts a set of allowed connections as inputs and then outputs a set of allowed connection groups. At 501, FIG. 5A, a TCP or a UDP outgoing connection group is selected. In other words, procedure 500 is applied separately for TCP (Transmission Control Protocol) outgoing connections and for UDP (User Datagram Protocol) outgoing connections. An analogous procedure for TCP and UDP incoming connections can be derived from procedure 500 by attending to the portions relating to ports as requests for incoming connections do not specify a remote IP address. In other words, for requests for incoming connection, group connection using local_port as described for port grouping with reference to FIG. 6.

At 502, a determination is made whether there is any connection request with the remote address, remote port, and local port all wildcarded, that is, the request can be fulfilled with any remote address, any remote port, and any local port. If so, then at 503, all connections for the process under consideration are formed into one group with the following parameter-value pairs: PORT_CATEGORY=ALL; PORTGROUPTYPE=ALLOWABLE; IPCATEGORY=ALL; and IPGROUPTYPE=ALLOWABLE. The outbound connection grouping procedure ends at 503. However, if the determination at 502 was that there was no such across-the-board wildcarding allowed connection request, procedure 500 proceeds to 504.

At 504, a determination is made whether or not there is any connection with remote_address and remote_port wildcarded but local port has a valid number. Note that this condition may be satisfied by multiple allowed connection requests with distinct local port numbers. If the determination at 504 is positive, then, for each such valid #-(number) local port, form a group with the following parameter/value pairs: PORT_CATEGORY=ALL; PORTGROUPTYPE=ALLOWABLE; IPCATEGORY=ALL; IPGROUPTYPE=ALLOWABLE; and multicastPORT=local port valid #. Procedure 500 proceeds to 506 either from 505 or from a negative determination at 504.

At 506, FIG. 5B, a determination is made whether or not there is at least one remaining connection with a remote address wildcarded. If yes, then at 507, all process-connection requests for the subject process are grouped by remote port with the following parameter/value pairs: PORT CATEGORY=COMMON/EPHEMERAL/OTHERS; PORTGROUPTYPE=—SPECIFIC; IPCATEGORY=ALL; and IPGROUPTYP=ALLOWABLE. Note there can be more than one such group, with each group having a distinct remote port number. Procedure 500 proceeds to 508 from 507 and from 506 in the case of a negative determination.

At 508, a determination is made whether or not there is at least one remaining allowed connection request with remote port wildcarded and the destination service is the remote address. If so, then at 509, connections are grouped by destination service with the following parameter/value pairs: PORT CATEGORY=ALL, PORTGROUPTYPE=ALLOWALL; IPCATEGORY=GLXSERVICE; and IPGROUPTYP=SPECIFIC. Note that more than one group may be formed for a given process at 509. Action 509 continues to action 510, which also follows action 508 if the determination at 508 is negative.

At 510, FIG. 5C, a determination is made whether or not there is at least one remaining allowed process-connection request with the remote port wildcarded and a destination service is not specified by the remote address. If yes, then at 511, connections are grouped by remote address and split by IP category and grouped into one with the following parameter/value pairs: PORT CATEGORY=ALL; PORTGROUPTYPE=ALLOWALL; IPCATEGORY=<ip category>; and IPGROUPT YP=SPECIFIC. Procedure 500 continues from 511 to 512, which is also arrived at from 510 in case the determination is negative.

At 512, a determination is made whether or not there is at least one remaining process-connection request with destination service specified as a remote address. If yes, then at 513, connections are grouped by remote port to form one or more groups with the following parameter/value pairs: PORT CATEGORY=COMMON/EPHEMERAL=/OTHER; PORTGROUPTYPE=SPECIFIC; IPCATEGORY=<GLXSERVICE>; IPGROUPTYP=SPECIFIC. Procedure 500 proceeds from 513 to 514, which is also reached if the determination at 512 is negative.

Figure 7:
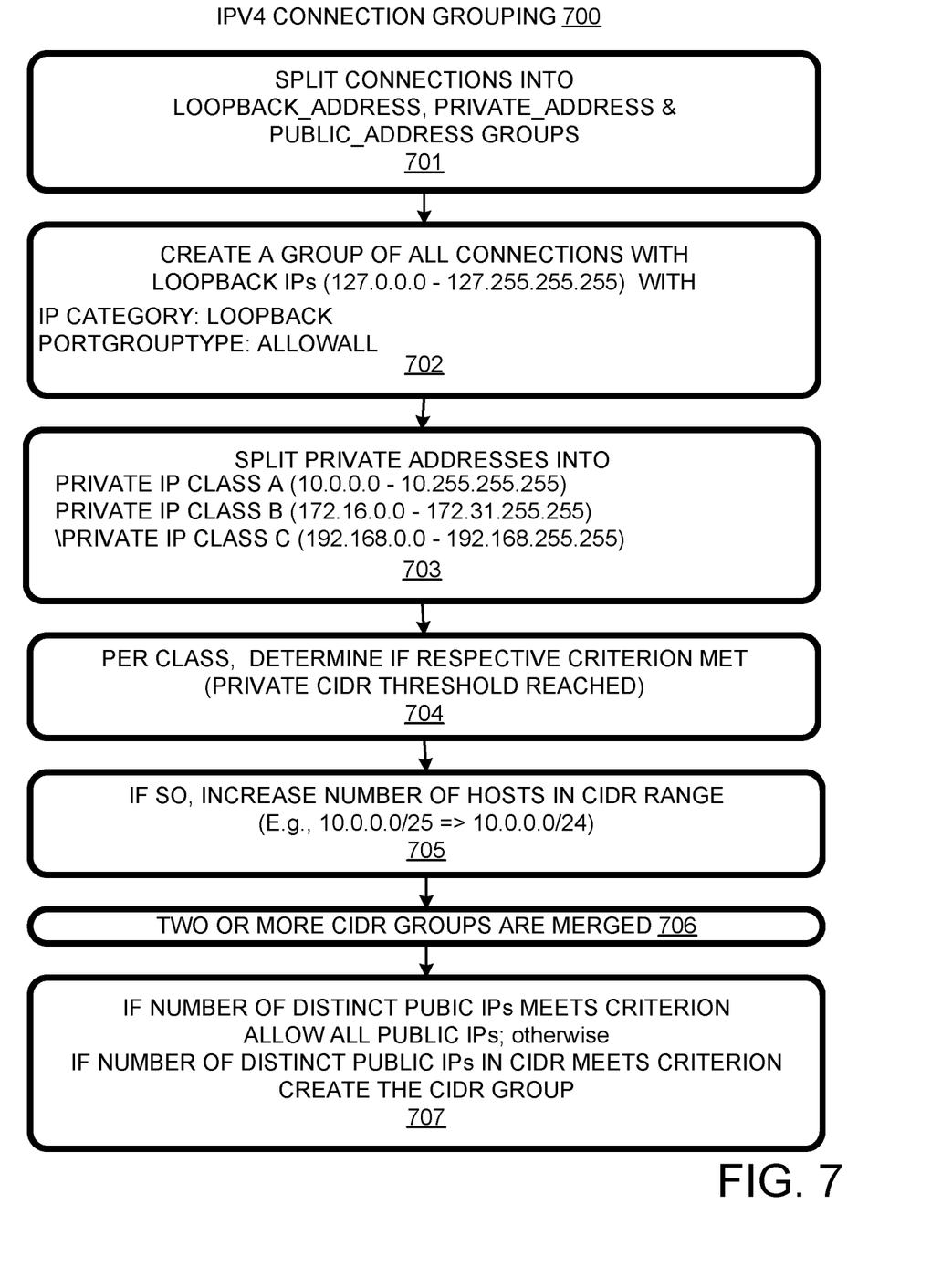
FIG. 7 is a flow chart of an IPV4 address grouping procedure of the connection grouping action of FIG. 3.
Figure 8:
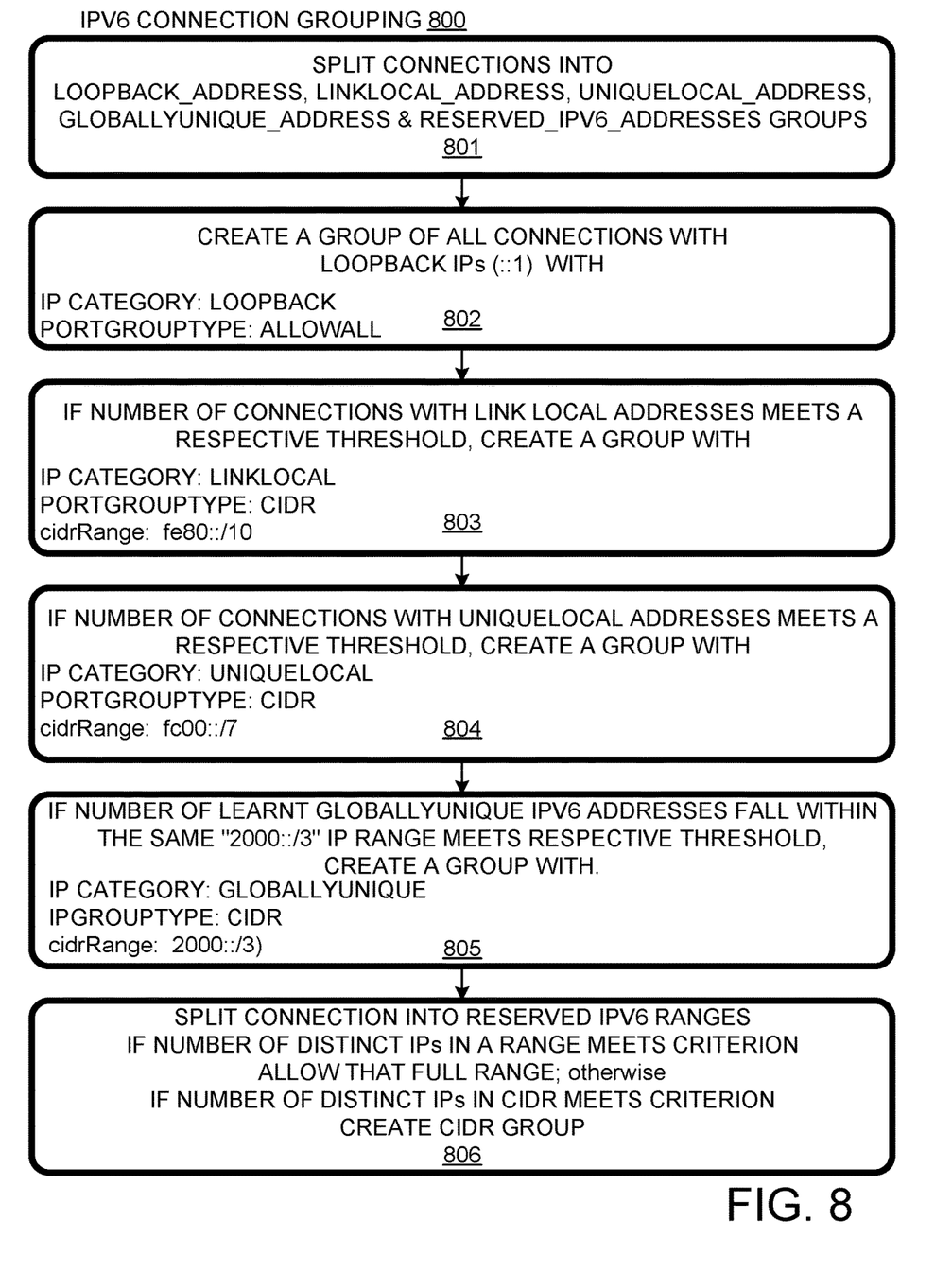
FIG. 8 is a flow chart of an IPV6 address grouping procedure of the connection grouping action of FIG. 3.

At 514, a determination is made whether or not there is at least one remaining connection. If so, then at 515, connections are grouped as in port grouping and within each port group, IP addresses are grouped as described below for IP grouping (FIGS. 7 and 8). For example, the IP grouping can assume a port-range threshold of 10 and a private IP cidr threshold of 10. Procedure 500 ends at 516 from either 515 or a negative result from 514.

Figure 6:
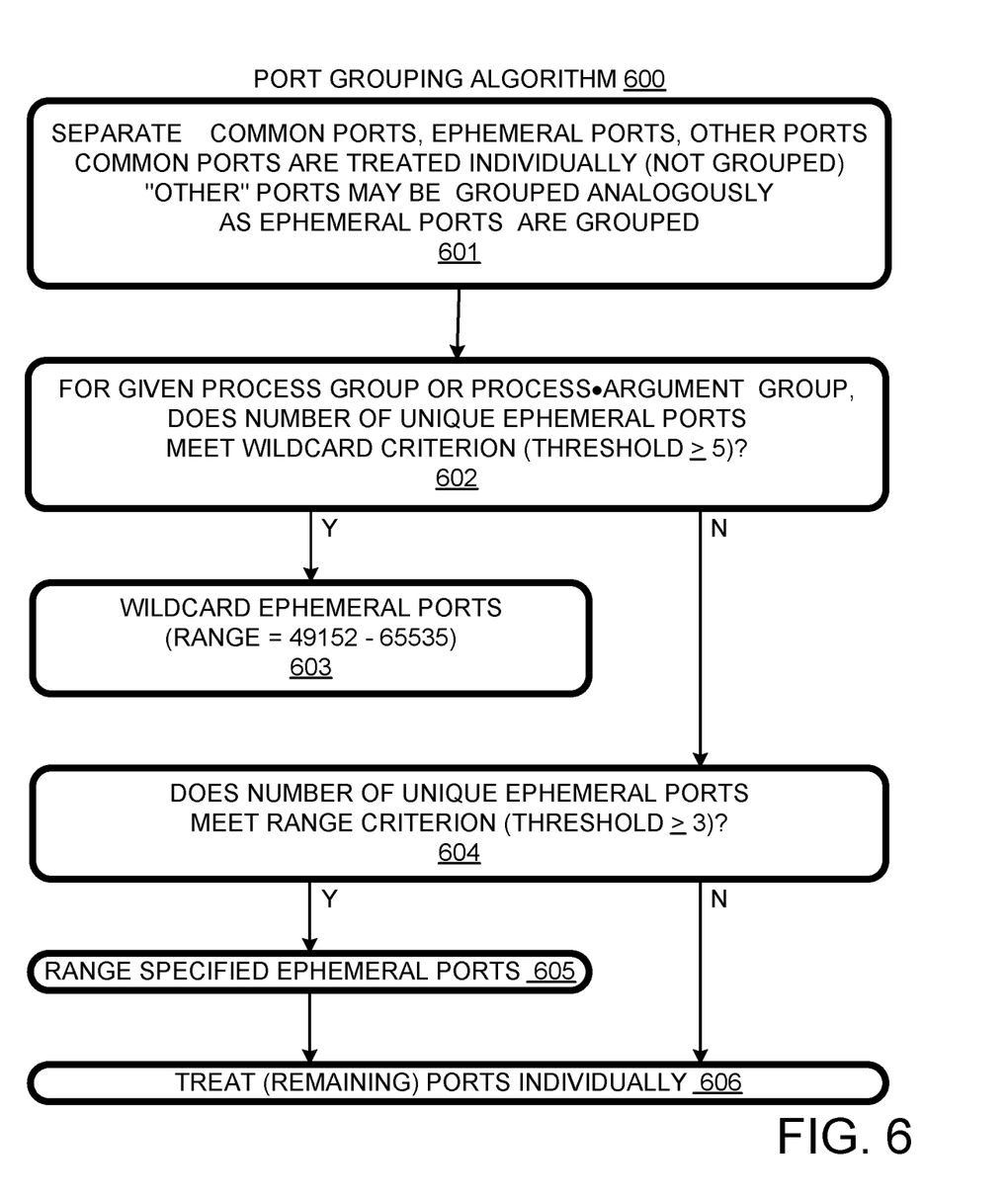
FIG. 6 is a flow chart of an ephemeral port grouping procedure of the connection grouping action of FIG. 3.

A port grouping procedure 600 is flow charted in FIG. 6. At 601, ports are partitioned into common ports, ephemeral ports, and "other" ports. Common ports are treated individually and are not grouped. Ephemeral ports are grouped as described at 602 to 606. In some embodiments, "other" ports are grouped in a manner analogous to the procedure used to group ephemeral ports. In other embodiments, "other" ports are treated individually and not grouped.

At 602, a determination is made whether or not the number of unique (distinct) ephemeral ports in a connection group meets a wildcard criterion, e.g., are there five or more distinct ephemeral ports in a connection group. If yes, then at 603 ephemeral ports are wildcarded across the entire range (49152-65535) for ephemeral ports. Port grouping procedure 600 ends at 603 for ephemeral ports. If the result of 602 is negative, procedure 600 proceeds to 604.

At 604, a determination is made whether or not the number of unique (distinct) ephemeral ports meets range criterion, e.g., three or more distinct ephemeral ports. If so, then at 605, a range extending from the minimum ephemeral port number to the maximum ephemeral port number is specified. In some embodiments, the range is only created for contiguous ephemeral port numbers. Any ports remaining after 605 and after a negative result from 604 are treated individually at 606. Procedure 600 ends at 606.

Within the port groups formed by procedure 600, IP address groups are formed. IPV4 addresses and IPV6 addresses are treated separately. IPV4 address grouping is flow charted in FIG. 7. At 701, IPV4 addresses are partitioned into loopback addresses, private addresses, and public addresses. These groups are treated separately.

At 702, a group of all included loopback addresses (127.0.0.0-127.255.255.255) is created with the following parameter/value pairs: IP CATEGORY=LOOPBACK; PORTGROUPTYPE: ALLOWALL.

At 703, private addresses are classified as follows: Private IP Class A (10.0.0.0-10.255.255.255); Private IP Class B (172.168.0.0-172.31.255.255); and Private IP Class C (192.168.0.0-192.168.255.255). At 704, or each private IP address class, determine if a respective criterion is met, e.g., if a private CIDR (Classless Inter-Domain Routing) threshold (e.g., 20 distinct IP address in the same private IP class) is reached. If so, then, at 705, then increase the number of hosts in CIDR range, e.g., by reducing the CID the range is 10.0.0.0/25, decreasing the padding number by 1 yields 10.0.0.0/24, effectively doubling the number of addresses in the group. The group has the following parameter/value pairs: IPCATEGORY=PRIVATE; IPGROUPTYPE=CIDR. If two or more such groups are formed, they are merged into a group with the following parameter/value pairs: IPCATEGORY=PRIVATE; IPGROUPTYPE=ALLOWALL. In other words, if two private IP groups result from 705, all private IPV4 addressed are included in a merged group at 706.

At 707, consideration is given to grouping public IP addresses. If the number of distinct public IP addresses collectively specified by a port group of connection requests exceeds a respective threshold, then connections to all public IP addresses are allowed (for that port group). The resulting group is characterized by the following parameter/value pairs: IPCATEGORY=PUBLIC; IPGROUPTYPE=ALLOWALL. Otherwise, for each public CIDR, if the respective connection requests meet a respective criterion, a respective CIDR group of connections is created for entry into the whitelist. Each resulting connection group is characterized by the following parameter/value pairs: IPCATEGORY=PUBLIC; IPGROUPTYPE=CIDR. The procedure 700 for IPV4 ends at 707.

A procedure 800 for grouping IPV6 connections is flowcharted in FIG. 8. At 801, connections are split into LOOPBACK_ADDRESS, LINKLOCAL_ADDDRESS, UNIQUELOCAL_ADDRESS, GLOBALLYUNIQUE_ADDRESS, & RESERVED_IPV6_ADDRESSES groups. At 802, a group of all connections with LOOPBACK IPs (::1) is created with: IP CATEGORY=LOOPBACK; and PORTGROUPTYPE: ALLOWALL.

At 803, if the number of connections with LINKLOCAL addresses meets a respective threshold, a group is created with the following parameter/value pairs: IPCATEGORY=LINKLOCAL; PORTGROUPTYPE=CIDR; cidrRange=fe80::/10.

At 804, if the number of connections with uniquelocal addresses meets a respective threshold, a group is created with the following parameter/value pairs: IP_CATEGORY=UNIQUELOCAL; PORTGROUPTYPE=CIDR; cidrRange=fc00::/7. The rest of the IPV6 address space is considered as globally unique addresses.

At 805, create "/64" cidr group of any learnt IP and try to find if other learned IPs fall in same CIDR range. If number of IPs in this CIDR meets 'publicIpCidrThreshold', create a group with the following parameter/value pairs: IP CATEGORY = GLOBALLY UNIQUE; PORTGROUPTYPE=CIDR; cidrRange=,cidr-formed.(/64).

At 806, connections are split into reserved IV6 ranges, i.e., ""0000::/8", "01.00::/8", "0200::/7", "0400::/6", "0800::/5", "1000::/4", "4000:/3", "6000::/3", "8000::/3", "a000::/3", "c000::/3", "e000::/4", "f000::/5", "f800::/6", "fe00::/9", "fec0::/10", "ff00::/8"". If the number of distinct requested IPs in a range meets a respective criterion, then allow that full range. Otherwise, if the number of distinct requested Ips in CIDR meets criterion, create a CIDR group. This ends process 800.

Herein, a parameter is "wildcarded" if and only if its respective value can assume any value permitted by a respective protocol or can assume a contiguous range of exactly 2N. For example, IP ADDRESS=* and IP ADDRESS=10.0.0.* are both wildcarded IP addresses. On the other hand, IP ADDRESS=10.0.230 to 10.0.250 express a range of addresses, but is not wildcarded.

Herein, all art labelled "prior art", if any, is admitted prior art; all art not labelled "prior art", if any, is not admitted prior art. The illustrated embodiments, variations thereupon, and modifications thereto are provided for by the present invention, the scope of which is defined by the following claims.

What is claimed is:

1. A whitelist process comprising:
    detecting process-connection requests in which respective processes request respective connections, at least some of the process-connection requests specifying respective arguments;
    classifying processes so as to partition them between a wildcarded process process* (wildcarded-process) class and a process●argument class;
    grouping, into process●argument groups, process-connection requests by processes of the process●argument class by process and by argument, and grouping, into process* groups, process-connection requests by processes of the process* class by process and not by argument; and
    causing a whitelist to include,
        based on a first process●argument group of the process●argument groups, a first entry mapping a first process of the process●argument class to a first connection and a first argument,
        based on a second process●argument group of the process●argument groups, a second entry mapping the first process of the process●argument class to a second connection and a second argument, the second argument being distinct form the first argument, the second connection being distinct from the first connection, and
        based on a process* group of the process* groups, a third entry mapping a process of the process* class to a third connection, at least one of the first connection, the second connection and the third connection being wildcarded.

2. The whitelist process of claim 1 wherein the wildcarded connection includes a wildcarded port or a wildcarded Internet Protocol (IP address).

3. The whitelist process of claim 1 wherein the wildcarded connection in the whitelist is wildcarded based at least in part on a process-connection request for a wildcarded connection.

4. The whitelist process of claim 1 wherein the wildcarded connection in the whitelist is wildcarded based at least in part on a first threshold being met by a first number of distinct connections requested in a respective process* group or process●argument group.

5. The whitelist process of claim 1 wherein the whitelist includes a fourth entry mapping a fourth process to a non-wildcard connection range based at least in part on a second threshold being met by a second number of distinct connections requested in a respective process* group or process●argument group, the second threshold being less than the first threshold.

6. The whitelist process of claim 1 wherein the classifying includes classifying at least one process based on a previous classification of that process as either connection-behavior variant or connection-behavior invariant, and classifying at least one other process based on a number of distinct arguments represented in a group of its requests.

7. A whitelist system comprising non-transitory media encoded with code that, when executed by a processor, implements a whitelist process including:
   detecting process-connection requests in which respective processes request respective connections, at least some of the process-connection requests specifying respective arguments;
      classifying processes so as to partition them between a wildcarded process process* (wildcarded-process) class and a process●argument class;
   grouping, into process●argument groups, process-connection requests by processes of the process●argument class by process and by argument, and grouping, into process* groups, process-connection requests by processes of the process* class by process and not by argument; and
   causing a whitelist to include,
      based on a first process●argument group of the process●argument groups, a first entry mapping a first process of the process●argument class to a first connection and a first argument,
      based on a second process●argument group of the process●argument groups, a second entry mapping the first process of the process●argument class to a second connection and a second argument, the second argument being distinct form the first argument, the second connection being distinct from the first connection, and
      based on a process* group of the process* groups, a third entry mapping a process of the process* class to a third connection, at least one of the first connection, the second connection and the third connection being wildcarded.

8. The whitelist system of claim 7 wherein the wildcarded connection includes a wildcarded port or a wildcarded Internet Protocol (IP address).

9. The whitelist system of claim 1 wherein the wildcarded connection in the whitelist is wildcarded based at least in part on a process-connection request for a wildcarded connection.

10. The whitelist system of claim 7 wherein the wildcarded connection in the whitelist is wildcarded based at least in part on a first threshold being met by a first number of distinct connections requested in a respective process* group or process●argument group.

11. The whitelist system of claim 7 wherein the whitelist includes a fourth entry mapping a fourth process to a non-wildcard connection range based at least in part on a second threshold being met by a second number of distinct connections requested in a respective process* group or process●argument group, the second threshold being less than the first threshold.

12. The whitelist process of claim 7 wherein the classifying includes classifying at least one process based on a previous classification of that process as either connection-behavior variant or connection-behavior invariant, and classifying at least one other process based on a number of distinct arguments represented in a group of its requests.

13. The whitelist process of claim 7 further comprising the processor.

* * * * *